Figure 1:
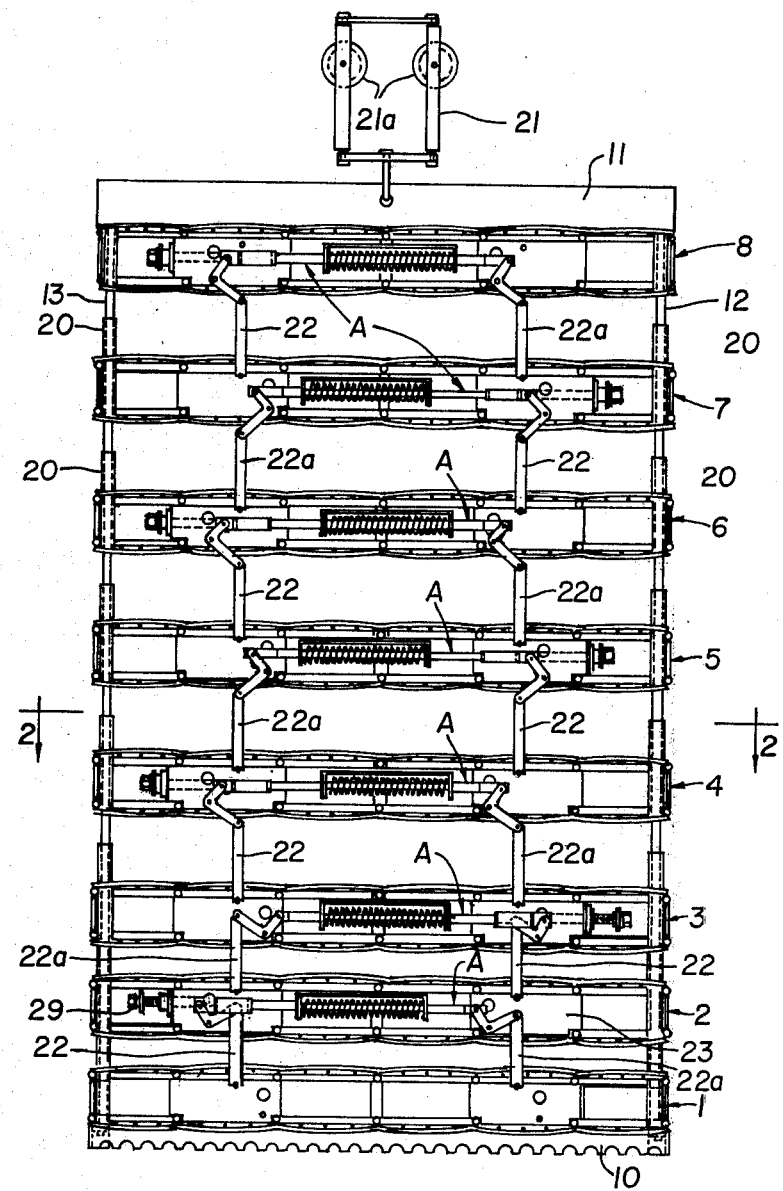

United States Patent [19]

Orlowski et al.

[11] 4,341,154
[45] Jul. 27, 1982

[54] CAGE FOR COMPRESSING FOOD ARTICLES

[75] Inventors: Gerald J. Orlowski, Scottsdale, Ariz.; Thomas E. Dugle, Cincinnati, Ohio

[73] Assignee: Armour and Company, Phoenix, Ariz.

[21] Appl. No.: 194,673

[22] Filed: Oct. 6, 1980

Related U.S. Application Data

[63] Continuation of Ser. No. 963,909, Nov. 24, 1978.

[51] Int. Cl.$^3$ .............................................. B30B 7/02
[52] U.S. Cl. ................................... 100/194; 99/351; 100/268
[58] Field of Search ................. 99/349, 351; 100/194, 100/195, 265, 267, 268, DIG. 10; 17/44.2; 211/113, 117, 119

[56] References Cited

U.S. PATENT DOCUMENTS

| 6,101 | 2/1849 | Kellogg | 100/268 |
|---|---|---|---|
| 1,986,115 | 1/1935 | Offenhauser | 99/349 |
| 2,310,956 | 2/1943 | Hoy | 99/351 |
| 2,827,840 | 3/1958 | Kemp | 100/265 X |
| 3,155,030 | 11/1964 | Curtis | 100/194 |
| 3,473,465 | 10/1969 | Tonjum | 100/194 |
| 3,618,511 | 11/1971 | Matthews | 100/194 |
| 3,750,563 | 8/1973 | Tonjum | 100/194 |
| 4,157,771 | 6/1979 | Smith | 100/268 X |

FOREIGN PATENT DOCUMENTS 1082728 11/1960 Fed. Rep. of Germany ...... 100/194

*Primary Examiner*—John M. Jillions
*Attorney, Agent, or Firm*—Frank T. Barber; Carl C. Batz

[57] ABSTRACT

A portable cage for compressing food articles during processing of the articles as by heating, smoking or the like. The cage includes means for moving a pair of trays toward each other to apply pressure on food articles between the trays and means for limiting the pressure so applied to a predetermined amount. The device is further capable of applying different predetermined pressures to articles on different trays, the amounts of such predetermined pressures being determined so as to offset the differences of the weights of the articles on the trays to thereby make the total pressures on the food articles on each tray more uniform. The mechanism is easily operable to open and close the cage for loading and unloading of the articles but is capable of developing substantial pressures when the trays are pressed against the food articles. Another feature of the improved cage is the provision of trays having spaced screens with mechanisms between the screens for bringing pressure on the food articles.

8 Claims, 3 Drawing Figures

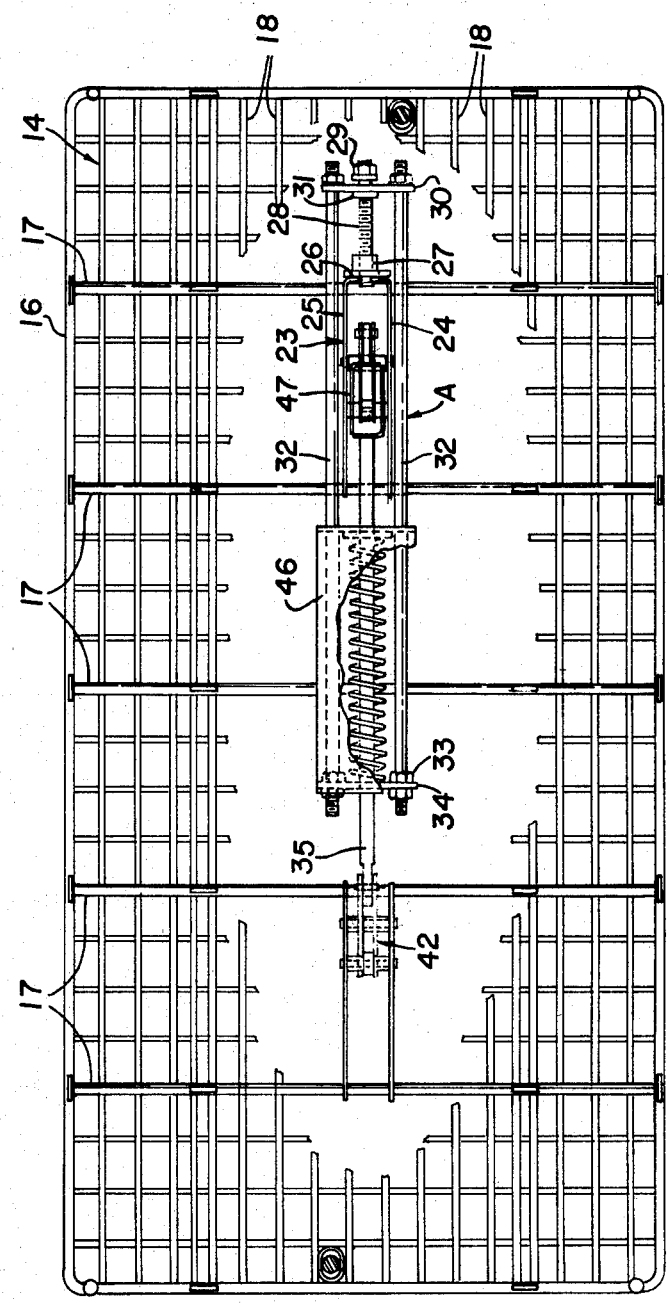
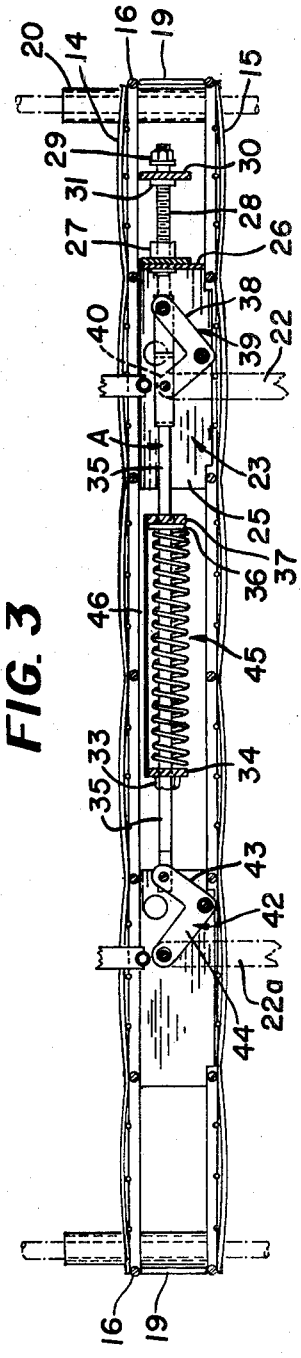
FIG. 2
FIG. 3

CAGE FOR COMPRESSING FOOD ARTICLES

This is a continuation of application Ser. No. 963,909, filed Nov. 24, 1978.

This invention relates to a cage for food articles and more particularly to a cage in which articles such as hams can be brought under pressure for processing as by heating, smoking, cooling or the like.

BACKGROUND

Food products such as hams and certain types of sausages have commonly been placed between screens and the screens fastened together by attaching springs under tension about the periphery of the screens, the tension of the individual screens being utilized to urge the screens toward each other. This practice is tedious and requires a great amount of time and labor; also there is a tendency to press the food articles nearer the periphery of the screens to a greater degree than those in the center portion of the screens.

In the Matthews U.S. Pat. No. 3,618,511 a cage is provided having spaced shelves with presser screens above the shelves. The presser screens are moved upwardly of the shelves when the springs at the bottom of the cage are compressed to open the shelves for loading. To do this the cage is moved under an air cylinder. When the cylinder is relieved and the springs expand, the presser screens are urged against the articles on each of the shelves.

A disadvantage of the Matthews cage is that each time the cage is loaded or unloaded, it must be brought under a power source such as the air cylinder above mentioned which is an inconvenience and which limits its usefulness. Another disadvantage is that it does not utilize the weight of the food articles on the upper shelves for bringing pressure on the articles on lower shelves. Still another disadvantage is that the articles on the different shelves will receive the same pressure only if they are the same in height.

Objects of this invention are to provide a cage for compressing food articles which is effective for bringing the food articles on different trays under substantially uniform pressure. Another object is to provide such a cage which can be operated easily and without any substantial effort to open the cage for loading and for closing the cage when it is loaded. Another object is to utilize the weight of the articles on the upper trays to provide pressure for compressing the articles on the lower trays. Another object is to provide improved "sandwich" type trays having double screens with moving mechanisms between the screens.

Since in utilizing the weight of the articles on upper trays for compressing articles on lower trays, it is normal that the weight of the articles on the highest tray bears against the top tray, the weight of the articles on the two top trays bears against the second highest tray, and the weight of the articles on the top three trays bears against the third highest tray, etc., so that the pressure on the articles due to the weight of the food articles increases toward the bottom of the cage. It is a special object of this invention to provide auxiliary pressure on each of a series of trays which decreases toward the bottom of the series so that the combined pressure due to the weight of the articles and the auxiliary pressure so provided will be more nearly uniform.

THE DRAWINGS

One embodiment of this invention is illustrated in the accompanying drawings in which FIG. 1 is a view in elevation of the improved cage for compressing food articles;

FIG. 2 is a plan view of one of the trays taken along line 2—2 of FIG. 1 with parts broken away to show parts otherwise hidden; and FIG. 3 is an enlarged sectional view of one tray.

DESCRIPTION

As illustrated, the improved cage has a frame which includes a base 10, a top member 11 and rods 12 and 13. FIG. 1 shows eight trays which are designated by the characters 1-8. Each of these trays has a top screen 14 and a bottom screen 15. The top screen (see FIG. 2) has a supporting border wire 16 and cross supporting wires 17 and wire screening 18 is secured over the supporting wires, the wire screening being formed of wires which are of a size smaller than the supporting wires.

Each of trays 1-8 include a bottom screen 15 having a border wire, cross supporting wires and wire screening similar to those of the top screen 14 except that the wire screening is in this case below the border and cross wires. Straps 19 hold the top and bottom screens in parallel spaced relation, thus each of the trays has a pair of parallel spaced screens and are sometimes called sandwich trays.

Each of trays 1-8 have tubular pieces 20 secured to the border wires at each of their ends. In the assembly of the cage the trays are mounted in the frame by passing the rods 12 and 13 through the tubes 20. Except for the tubes of the top tray 8, the tubes all have extensions above the top screen of the tray which serves to provide minimum spacing between the trays. Each of trays 2-8 are slideable along rods 12 and 13 to open and close the spacing between the trays.

The truck 21 at the top of the cage has rollers 21a for engaging an overhead rail, to make the cage portable.

Each of trays 2-8 have a mechanism A which is disposed between the top and bottom screens and which has a link 22 which extends downwardly and pivotly engages the next lower tray. Except for varying strength of its spring, the mechanism A for each tray may be exactly the same.

Referring now more particularly to FIGS. 2 and 3, we will describe the mechanism A.

The U-shaped member 23 has the vertical side plates 24 and 25 and the end plate 26. Side plates 24 and 25 are welded or otherwise fixedly attached to the cross supports 17 and serve also to maintain the spacing between the trays. An internally threaded nut 27 is fixedly secured within an opening in end plate 26. A threaded rod 28 engages nut 27 and has on its one end a hexagon head 29. Rod 28 extends through an opening in the plate 30. This rod may turn freely within the plate opening but has blocking nut 31 which causes the plate to move along with the rod when the rod is moved longitudinally.

Rods 32, one on each side of rod 28, have their ends threaded and secured to the plate 30 by the nuts 33. The rods 32 are threaded at their other ends and secured by nuts 33 to the plate 34.

Intermediate of the ends of rods 32 is a plate 37 which is welded to the rods 32 and which has a center opening.

A center rod 35 extends through the center opening of plates 34 and 37 and is free to move longitudinally in these openings. One end of rod 35 is pivotedly connected with the arm 38 of the bell crank 39. The bell crank 39 is formed of parallel pieces which are pivotedly secured to the bottom screen and the end of the rod 35 is pivotedly attached to arm 38 between the pieces of the bell crank. The link 22 has its one end extending within the pieces of the bell crank 39 and is pivotedly connected with arm 40. The other end of link 22 extends downwardly and is pivotedly attached to the top screen of the lower tray.

The other end of rod 35 is pivotedly attached to the arm 43 of the bell crank 42. The other arm 42 of bell crank 42 is pivotedly connected by link 22a with a top screen of the lower tray.

The plate 36 is welded to rod 35 and is of a size such that it will not go through the center opening in plate 37. A coil spring 45 extends about rod 35 between the plates 34 and 36 and a cover 46 extends over the spring from plate 34 to plate 37. Spring 45 is intended to become compressed only when the pressure developed by this mechanism reaches a certain predetermined amount. Therefore, the spring is selected with the idea that when it comes under pressure of this predetermined amount, it will shorten as necessary but will maintain substantially the same pressure against plates 34 and 36 as it shortens. Springs of different compressive strengths may be selected for different trays.

When the trays 1–7 have been loaded with food articles and each of the trays 2–8 lowered to close the cage, the weight of tray 7 and the food articles thereon bear against the articles on tray 6; this total weight plus the weight of tray 6 and articles thereon bear against the articles on tray 5, and so on, so that the weight of trays 8 to 2 and articles thereon bear against the articles on tray 1. If, for example, 50 pounds of hams or other food articles are loaded onto each of trays 1–7 and the trays 2–8 moved into contact with the hams on the trays below, the pressure tending to compress the hams due to their own weight may vary from a very small amount between trays 7 and 8 to more than 300 pounds between trays 1 and 2. By providing an additional pressure developed by mechanism A on the food articles on each of trays 1–7 which developed pressure is approximately inversely proportional to pressure due to the weight of the tray and articles thereabove on each of these trays, the total pressure on the articles may be equalized. For example, a developed pressure of the order of 300 pounds on the articles of tray 7 and the order of 5 pounds of developed pressure on the articles on tray 1, the total pressure on the articles of each tray is equalized and made more uniform.

Accordingly, the compressive strength of the spring 45 at tray 8, or in other words, the pressure at which this spring will shorten, might be predetermined at, for example, about 300 pounds while the compressive strength of the spring 45 at tray 2 might be predetermined at, for example, 5 pounds or might be omitted altogether.

As seen in FIG. 1 there is a mechanism A disposed within the top and bottom screens of trays 2–8, but as here shown this mechanism is turned end for end in alternate trays so that the screw head 29 used for opening and closing the trays is alternately at different ends of the cage. Also, in FIG. 1, the mechanism A at tray 2 is in condition to provide minimum spacing between trays 1 and 2 and the mechanism A in tray 3 is in condition to provide minimum spacing between trays 2 and 3 but the mechanisms A at trays 4–8 are shown in condition to provide maximum spacing between these trays and the next lower tray.

OPERATION

For purposes of explanation let us consider the pair of trays which includes trays 1 and 2. As shown in FIG. 1 trays 1 and 2 have the minimum spacing between them. To open the cage to permit loading on tray 1 the operator may use a crank wrench and turn the head 29 (see FIGS. 2 and 3) clockwise which causes the rod 28 to turn within nut 27 and move plate 30 toward the left as seen in FIGS. 2 and 3. This plate 30 moves with it the rods 32, the plates 34 and 37, the plate 36 and rod 35, and the spring 45. Also since rod 35 is connected at one end with an arm of bell crank 39 and at its other end with an arm of bell crank 42 each of these bell cranks are rotated about its pivot in a counterclockwise direction and due to the connection of the other arms of the bell cranks with links 22 and 22a respectively, the tray 2 is moved away from the tray 1, to open the cage for loading onto tray 1. It may be noted that this movement to open the cage does not compress spring 45 or otherwise affect the spring since the spring merely moves idly along with the other moving mechanism. Because of this, the mechanism turns easily.

When the hams or other food articles have been loaded onto tray 1, the operators may rotate the head 29 in a counterdirection. This causes the threaded rod 28 to move to the right, as seen in FIGS. 2 and 3, and plate 30, rod 32, plates 37 and 34, spring 45, plate 36, and rod 35 all move with it. This causes bell cranks 39 and 42 to be rotated in a clockwise direction as seen in FIGS. 2 and 3, and due to the connection of the bell cranks with links 22 and 22a, this serves to move tray 2 toward tray 1. During this operation also the spring 45 only moves along with other mechanism and is not engaged in any function.

When this latter operation has proceeded to the extent that the tray 2 comes into contact with the top of the food articles on tray 1, pressure is developed against the food articles on this tray, and when such developed pressure reaches the predetermined compressive strength of spring 45 as translated through the bell crank, the rod 35 stops moving and continued turning by the operator causes the spring to be compressed and shortened while plate 37, being free to move along rod 35, separates from plate 36. As this happens, the spring continues to maintain pressure corresponding to its compressive strength against plate 36 and rod 35 which transfers this pressure to tray 2 to be applied against the food articles on tray 1.

As the treatment of the food articles by heating, smoking or the like is taking place these articles may be relaxed and flattened somewhat, and the spring 45 may lengthen while maintaining the predetermined pressure on plate 36 and rod 35 and against the somewhat flattened articles as a result of the processing.

When the processing is over and it is desired to unload the processed foods, the operator may then turn head 29 in the same direction as above explained for opening the cage. There is resistance to such turning while the developed pressure is being applied, but turning of the head 29 is relatively easy for either opening or closing the cage when the tray 2 is out of contact with the food articles.

The spring 45, as it operates in the mechanism provided, will be seen to act as a means of limiting the pressure which is developed by this mechanism, this limitation coming into effect when a predetermined pressure is developed. At the same time, the spring acts to maintain the predetermined pressure even though the food articles may flatten somewhat as a result of heating or other processing. All this is accomplished while permitting the cage to be opened and closed freely and easily for purposes of loading and unloading. Further, the weight of the food articles above a tray is utilized to provide pressure tending to press that tray against the articles on the next lower tray while at the same time providing substantially the same total pressure against the food articles on each tray.

The improved trays will also handle articles of varying heights. If, for example, a tray be loaded with articles which are somewhat higher than normal, the improved cage will operate to apply the same predetermined pressure on the articles.

In the foregoing description it will be understood that when we speak of spring 45 having a predetermined compressive strength we mean that strength which as it may be translated through bell cranks 39 and 42 and links 22 and 22a is substantially equivalent to the developed pressure on the food articles which is predetermined for a particular tray.

Further, we did not mention in the foregoing description a design detail for avoiding the blocking movement of bell crank 39. Since the bell crank 39 moves in the same vertical plane as does the rod 35, arm 40 of this bell crank would strike rod 35 as this arm moves upwardly were it not for a hollow rectangular shell structure 47 (see FIG. 2) which is built into the rod 35 and which permits arm 40 to move upwardly through the hollow of this structure.

While in describing the operation of mechanism A in moving trays toward each other about food articles, we have referred to trays 1 and 2, the same operation is understood to take place with respect to any other pair of adjacent trays. We may also refer to any three adjacent trays which provide for the loading of articles on the lower and middle trays and with the mechanism as associated with each of the middle and upper trays. In such case, it is one feature of this invention that the spring 45 associated with the upper tray have a compression strength stronger than the spring 45 associated with the middle tray thus to provide a developed pressure which together with the weight of the food articles produces a total pressure on the food articles which is equalized and more nearly uniform on each of the middle and lower trays.

While but one embodiment of the invention has been illustrated and described in detail, it will be apparent to those skilled in this art that many embodiments may be constructed and many changes may be made all within the spirit of the invention and within the scope of the appended claims.

We claim:

1. A cage for compressing food articles comprising a series of vertically spaced trays which includes a lower tray having food articles thereon, a middle tray having food articles thereon, and an upper tray over the food articles on said middle tray, the weight of said middle tray and articles thereon bearing against the articles on said lower tray, means between said upper tray and said middle tray for moving said upper tray and said middle tray toward each other for developing pressure on said articles on said middle tray, and means between said middle tray and said lower tray for moving said middle tray and said lower tray toward each other and developing pressure on said articles on said lower tray, said first mentioned means being effective for developing a pressure on said articles on said middle tray which is greater than the pressure developed by said second mentioned moving means on said articles on said lower tray to bring the total pressure on the articles on each of said trays closer to equality.

2. A cage as set forth in claim 1 in which the pressures developed by said first mentioned means on the articles on said middle tray and the pressure developed by said last mentioned means on said articles on said lower tray are substantially inversely proportional to the weight of the trays and the articles thereon which bear against the articles on said trays whereby to equalize the total pressures on the articles on each of said middle and lower trays.

3. A cage as set forth in claim 1 in which each of said first and second mentioned moving means includes a spring for limiting the pressures so developed to predetermined values.

4. A cage as set forth in claim 3 in which the spring of said first mentioned means is stronger than the spring of said second mentioned moving means.

5. A cage for compressing food articles comprising a plurality of vertically spaced trays, said trays including a pair of trays the lower of which contains food articles thereon and the upper of which is above said food articles, means for moving said upper and lower trays toward each other and for developing pressure on said food articles, and spring means between said trays adapted to yield whenever a predetermined pressure is developed for limiting development of further pressure when said predetermined pressure is achieved, said moving means including a bell crank pivotally mounted in said upper tray and a link having its one end connected to an arm of said bell crank and having its other end connected to said lower tray.

6. A cage for compressing food articles comprising a plurality of vertically spaced said trays including a pair of trays the lower of which contains food articles thereon and the upper of which is above said food articles, means for moving said upper and lower trays toward each other and for developing pressure on said food articles, and spring means between said trays adapted to yield whenever a predetermined pressure is developed for limiting development of further pressure when said predetermined pressure is achieved, said moving means including a rod disposed between said trays and which is moved longitudinally in one direction as said trays are moved toward each other, said spring means being yieldable to permit interruption in the movement of said rod in said direction when said predetermined pressure is achieved.

7. A cage as set forth in claim 6 in which said spring means includes a compression spring which is coiled about said rod.

8. A cage as set forth in claim 6 which includes a bell crank mounted on said upper tray and having one arm thereof pivotally connected to said rod and another arm thereof pivotally connected through a link member to a lower tray.

* * * * *